US012340102B2

(12) United States Patent
Nomura

(10) Patent No.: US 12,340,102 B2
(45) Date of Patent: Jun. 24, 2025

(54) INFORMATION PROCESSING APPARATUS, CONTROL SYSTEM, METHOD, AND NON-TRANSITORY COMPUTER-READABLE STORAGE MEDIUM

(71) Applicant: Canon Kabushiki Kaisha, Tokyo (JP)

(72) Inventor: Naohiko Nomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/432,140

(22) Filed: Feb. 5, 2024

(65) Prior Publication Data
US 2024/0264756 A1 Aug. 8, 2024

(30) Foreign Application Priority Data
Feb. 8, 2023 (JP) ................................. 2023-017826

(51) Int. Cl.
G06F 3/06 (2006.01)
H04L 49/90 (2022.01)
H04L 49/9005 (2022.01)

(52) U.S. Cl.
CPC .......... G06F 3/0634 (2013.01); G06F 3/0604 (2013.01); G06F 3/0683 (2013.01); H04L 49/9005 (2013.01); H04L 49/9089 (2013.01)

(58) Field of Classification Search
CPC . H04L 49/90; H04L 49/9089; H04L 49/9005; G06F 3/06; G06F 3/0604; G06F 3/0634; G06F 3/0683
See application file for complete search history.

(56) References Cited

U.S. PATENT DOCUMENTS

| | | | | |
|---|---|---|---|---|
| 8,452,995 | B1* | 5/2013 | Lachwani | G06F 1/3253 713/320 |
| 2016/0378344 | A1* | 12/2016 | Nachimuthu | G06F 3/0685 711/103 |
| 2017/0003981 | A1* | 1/2017 | Erez | G06F 3/0685 |
| 2020/0133836 | A1* | 4/2020 | Mizushima | G06F 3/0652 |
| 2020/0293676 | A1* | 9/2020 | Hara | G06F 21/79 |

FOREIGN PATENT DOCUMENTS

JP 2008044223 A 2/2008

* cited by examiner

Primary Examiner — Khoa D Doan
(74) Attorney, Agent, or Firm — Venable LLP

(57) ABSTRACT

An information processing apparatus that communicates with a device includes a control unit that performs control to store, in a first operation mode, predetermined communication information that is information used for communication with the device in a first memory, and store, in a second operation mode different from the first operation mode, the predetermined communication information in a second memory whose capacity is smaller than a capacity of the first memory. When shifting from the first operation mode to the second operation mode, the control unit performs control of changing a setting of the predetermined communication information such that a size of a saving destination of packet data transferred to the second memory is a predetermined size.

19 Claims, 10 Drawing Sheets

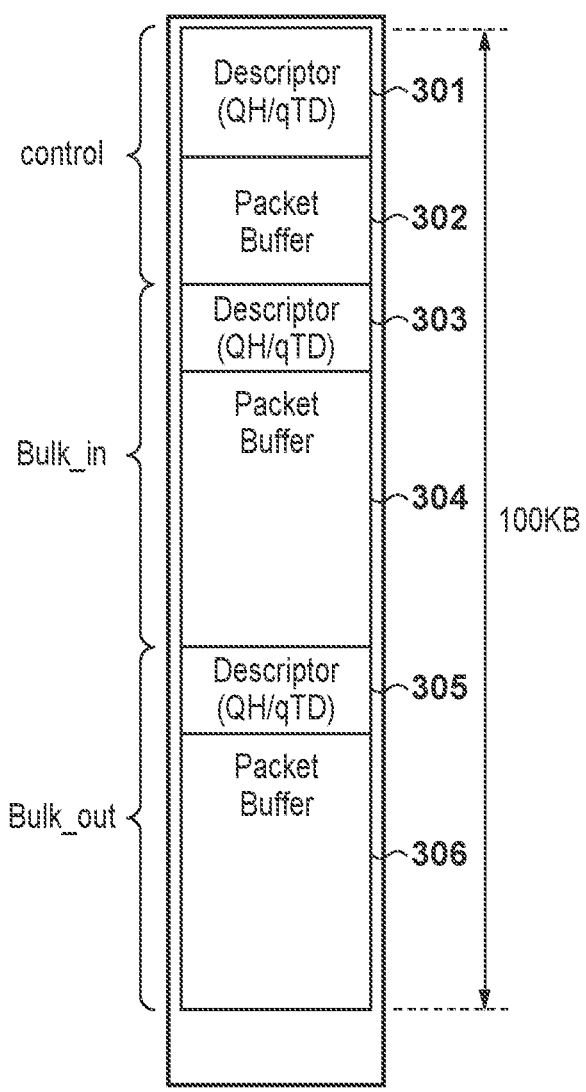
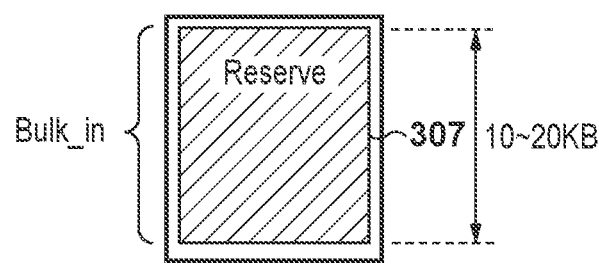

FIG. 4A
FIG. 4B
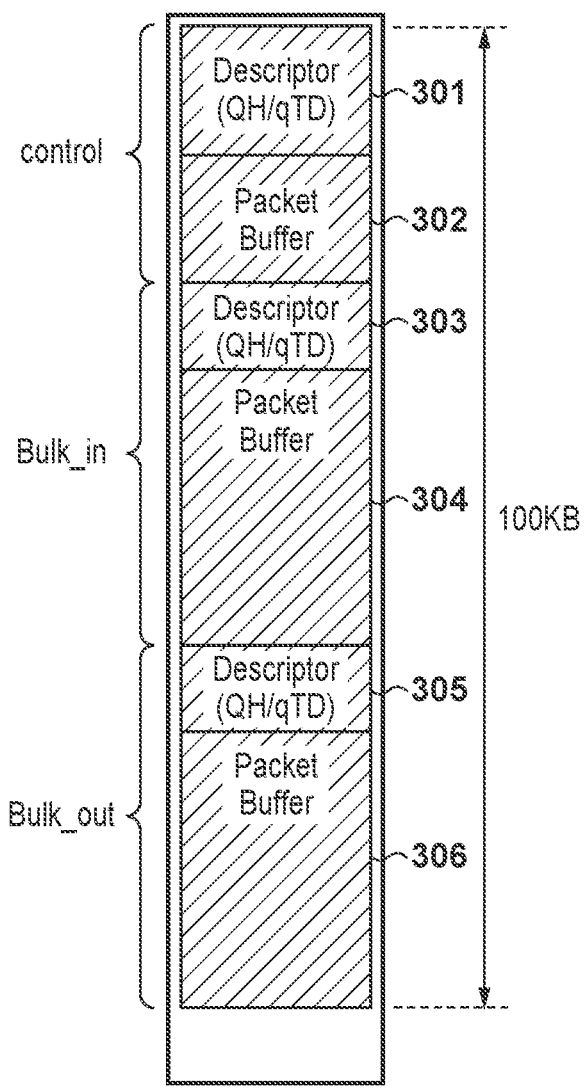
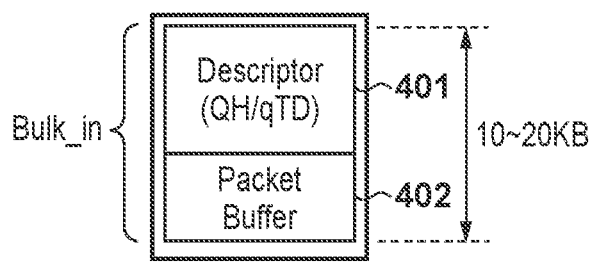

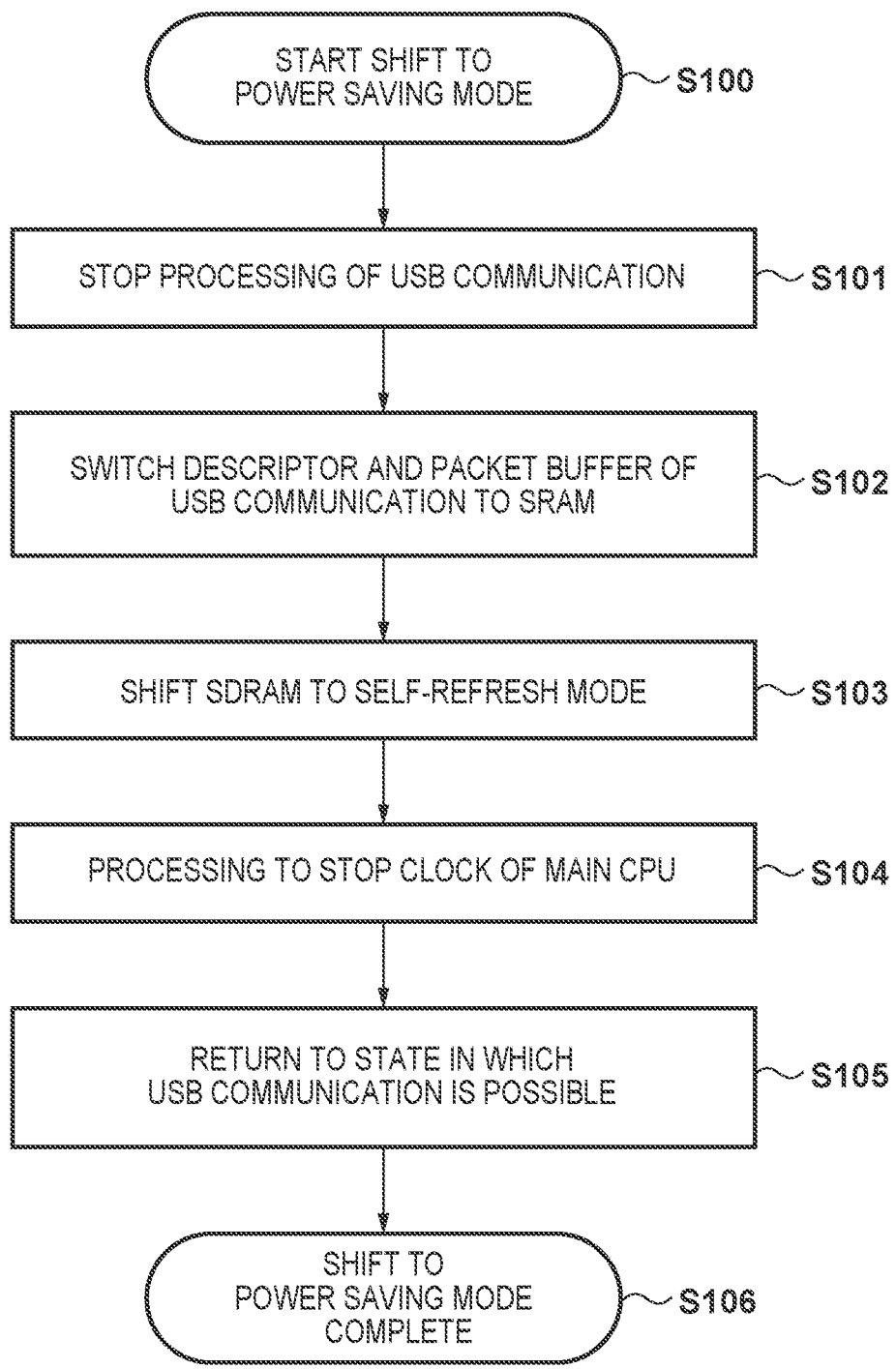

FIG. 10

|  | WIRED LAN | USB Device100 (WLAN) | USB Device101 (IC_CARD) |
|---|---|---|---|
| case0 | ○ | ○ | ○ |
| buffer size | 30KB | 8KB | 8KB |
| case1 | ○ | ○ | × |
| buffer size | 30KB | 24KB | — |
| case2 | × | ○ | ○ |
| buffer size | — | 24KB | 24KB |
| case3 | × | ○ | × |
| buffer size | — | 56KB | — |

INFORMATION PROCESSING APPARATUS, CONTROL SYSTEM, METHOD, AND NON-TRANSITORY COMPUTER-READABLE STORAGE MEDIUM

BACKGROUND OF THE INVENTION

Field of the Invention

The present invention relates to an information processing apparatus, a control system, a method, and a non-transitory computer-readable storage medium.

Description of the Related Art

In an information processing apparatus that executes communication based a standard such as USB with another device, communication information (for example, a descriptor) necessary for the communication is sometimes stored in a memory such as a Synchronous Dynamic Random Access Memory (SDRAM). The information processing apparatus sometimes causes the memory to operate in a self-refresh mode. In a state in which the memory is operating in the self-refresh mode, the information processing apparatus cannot execute communication with another device using the communication information stored in the volatile memory. Hence, for the state in which the memory is operating in the self-refresh mode, there is proposed continuing USB communication with a USB device using a Static Random Access Memory (SRAM) in a control controller as a memory for the USB communication (Japanese Patent Laid-Open No. 2008-44223).

SUMMARY OF THE INVENTION

The present invention can provide a technique of, in a state in which a memory is operating in the self-refresh mode, suppressing a capacity necessary for another memory to be used.

The present invention in its aspect provides an information processing apparatus communicating with a device, comprising at least one processor, and at least one memory coupled to the at least one processor, the memory storing instructions that, when executed by the processor, cause the processor to act as control unit configured to perform control to store, in a first operation mode, predetermined communication information that is information used for communication with the device in a first memory, and store, in a second operation mode different from the first operation mode, the predetermined communication information in a second memory whose capacity is smaller than a capacity of the first memory, wherein when shifting from the first operation mode to the second operation mode, the control unit performs control of changing a setting of the predetermined communication information such that a size of a saving destination of packet data transferred to the second memory is a predetermined size.

The present invention in its aspect provides a method comprising performing control to store, in a first operation mode, predetermined communication information that is information used for communication with the device in a first memory, and store, in a second operation mode different from the first operation mode, the predetermined communication information in a second memory whose capacity is smaller than a capacity of the first memory, wherein when shifting from the first operation mode to the second operation mode, control of changing a setting of the predetermined communication information is performed such that a size of a saving destination of packet data transferred to the second memory is a predetermined size.

The present invention in its aspect provides a non-transitory computer-readable storage medium storing instructions that, when executed by a computer, cause the computer to perform a method comprising performing control to store, in a first operation mode, predetermined communication information that is information used for communication with the device in a first memory, and store, in a second operation mode different from the first operation mode, the predetermined communication information in a second memory whose capacity is smaller than a capacity of the first memory, wherein when shifting from the first operation mode to the second operation mode, control of changing a setting of the predetermined communication information is performed such that a size of a saving destination of packet data transferred to the second memory is a predetermined size.

Further features of the present invention will become apparent from the following description of exemplary embodiments (with reference to the attached drawings).

BRIEF DESCRIPTION OF THE DRAWINGS

FIG. 3A is a view showing the configuration of an external volatile memory in a normal mode;

FIG. 3B is a view showing the configuration of an internal volatile memory in the normal mode;

FIG. 4A is a view showing the configuration of the external volatile memory in a power saving mode;

FIG. 4B is a view showing the configuration of the internal volatile memory in the power saving mode;

FIG. 5 is a flowchart for explaining shift processing from the normal mode to the power saving mode;

FIG. 10 is a view for explaining a selection table that defines a buffer size for each device.

DESCRIPTION OF THE EMBODIMENTS

Figure 1:
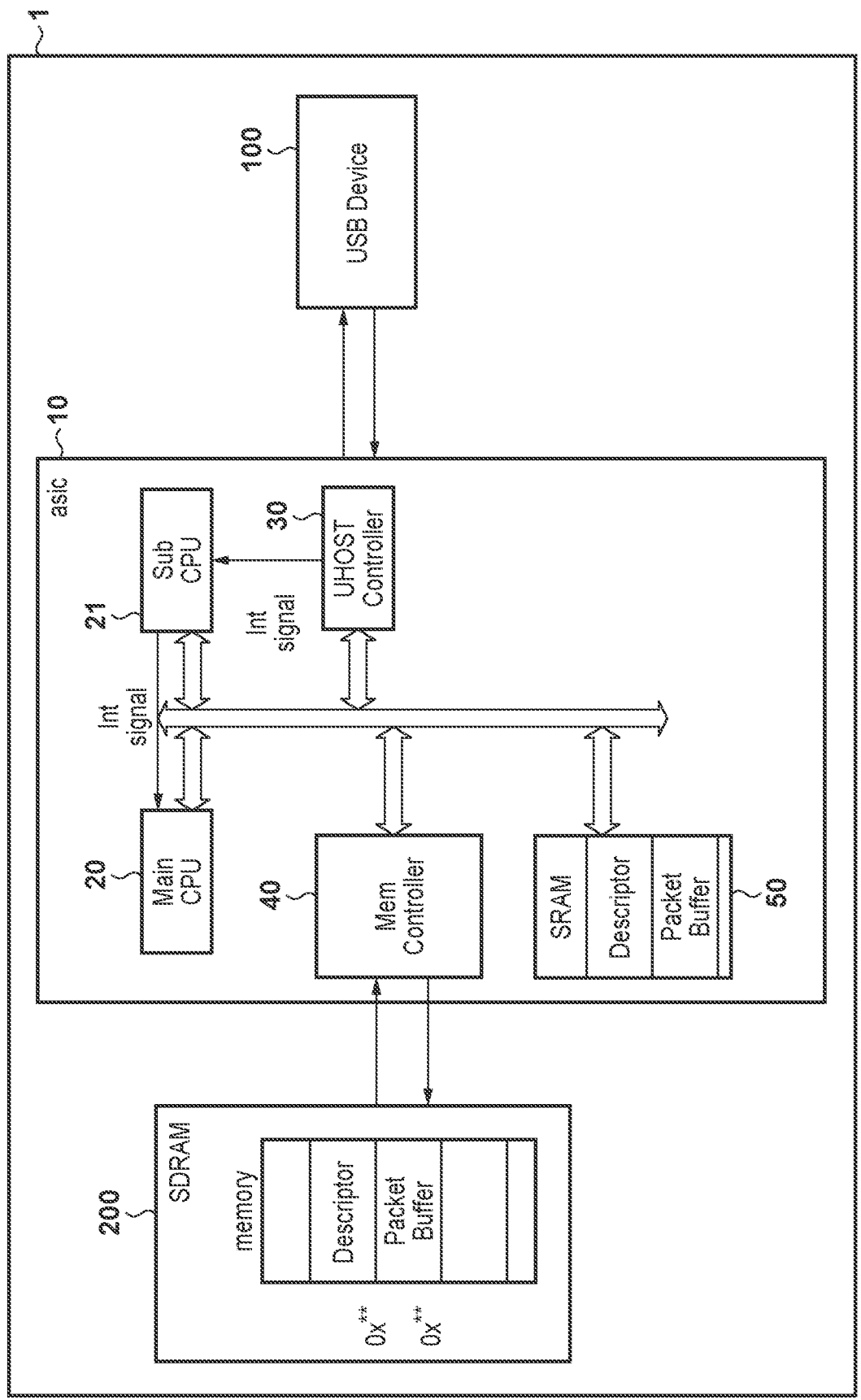
FIG. 1 is a schematic view of a control system according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the first embodiment, the setting of a descriptor used in USB communication is changed in accordance with the operation mode (a normal mode or a power saving mode) of a control system 1, and the saving destination of the descriptor and packet data is set to an SDRAM or an SRAM. An area which is the saving destination of a descriptor and in which the descriptor is saved/stored is called a descriptor buffer. An area which is the saving destination of packet data and in which the packet data is saved/stored is called a packet buffer. An SRAM that is an only memory a USB device can access in the power saving mode is provided with a descriptor buffer and a packet buffer minimum necessary for USB communication. In the first embodiment, when shifting from the normal mode to the power saving mode, the setting of the packet size of an end point descriptor is changed, and the descriptor and the buffer size necessary for USB communication with a USB device are suppressed in a range storable in the SRAM. Upon receiving start packet data, the information processing apparatus starts return processing from the power saving mode to the normal mode, sets the saving destination of the end point descriptor to the SDRAM, and copies the packet data received by the SRAM to the SDRAM. After shifting from the power saving mode to the normal mode, the information processing apparatus resumes the USB communication with the USB device, and it receives remaining packet data from the USB device.

FIG. 1 is a schematic view of a control system included in an information processing apparatus according to the first embodiment. Note that in this embodiment, the information processing apparatus is assumed to be a printer including a print unit (not shown) configured to execute printing. However, the information processing apparatus is not limited to this form and may be an apparatus other than a printer. More specifically, the information processing apparatus may be, for example, a scanner, a personal computer (PC), a smart speaker, a TV, a camera, or the like.

The control system 1 includes a main controller 10, a Universal Serial Bus (USB) device 100 connected to the main controller 10, and an external volatile memory 200. The USB device 100 is a Wireless Local Area Network (WLAN) device based on a USB communication standard. The WLAN device is a module including a wireless chip configured to execute communication via a WLAN. More specifically, communication via the WLAN is, for example, communication based on the IEEE802.11 standard. Note that the USB device 100 is not limited to this form and may be any device that communicates with the information processing apparatus based on the USB communication standard. More specifically, the USB device may be, for example, an IC card reader or a USB memory. In this embodiment, the USB device 100 is included in the control system 1. However, the USB device 100 is not limited to this form and may be a device outside the control system 1. That is, for example, the USB device 100 may be a personal computer (PC) connected to the information processing apparatus via a USB cable. However, for example, in USB communication with the PC, if the PC functions as a host in the USB communication standard, and the information processing apparatus functions as a device in the USB communication standard, control of the present invention to copy from the SDRAM to the SRAM need not be executed for a descriptor used in the USB communication with the PC. This is because if the information processing apparatus functions as a device in the USB communication standard, the descriptor used in the USB communication need not be held in the information processing apparatus. The external volatile memory 200 is a Synchronous Dynamic Random Access Memory (SDRAM) having a refresh function for suppressing power consumption. Note that the external volatile memory 200 is not limited to the SDRAM and may be, for example, another DRAM.

The main controller 10 is an Application Specific Integrated Circuit (ASIC). The main controller 10 includes a main CPU 20, a sub CPU 21, a USB host controller 30 that the main CPU 20 and the sub CPU 21 can access via a shared bus, a memory controller 40, and an internal volatile memory 50.

The main CPU 20 and the sub CPU 21 are each a Central Processing Unit. The main CPU 20 can control the print unit to cause the information processing apparatus to execute printing.

The USB host controller 30 is a USB host controller complying with an Enhanced Host Controller Interface (EHCI) and an Open Host Controller Interface (OHCI). The USB host controller 30 has a Direct Memory Access (DMA) function and transfers data transferred from the USB device 100 to the internal volatile memory 50 or the external volatile memory 200. Furthermore, the USB host controller 30 has a function (interrupt function) of outputting an interrupt signal after completion of DMA transfer and transmits the interrupt signal to the sub CPU 21. The interrupt function is a function capable of setting the output timing of the interrupt signal in accordance with a data transfer amount. For example, the USB host controller 30 outputs an interrupt signal to the sub CPU 21 for every one microframe that is the standard transfer unit of USB2.0. The data amount that can be transferred for one microframe can be changed by the setting of the descriptor stored in the internal volatile memory 50 or the external volatile memory 200.

The memory controller 40 executes the power saving mode of the external volatile memory 200 or inhibits the execution based on the presence/absence of access to the external volatile memory 200. The memory controller 40 executes refresh processing to the external volatile memory 200 during execution of the normal mode. On the other hand, the memory controller 40 controls the external volatile memory 200 such that self-refresh processing that is power saving refresh processing is executed during execution of the power saving mode of the external volatile memory 200, thereby causing the external volatile memory 200 to operate in the self-refresh mode. Self-refresh processing is processing of replenishing only minimum electric charges capable of holding information to the external volatile memory 200. The self-refresh processing is automatically executed by a refresh circuit incorporated in a DRAM chip including the external volatile memory 200. This can suppress the power consumption of the external volatile memory 200.

The internal volatile memory 50 is a small-capacity Static Random Access Memory (SRAM) that can be incorporated in a chip (that is, the main controller 10). The SRAM is a cache memory and does not need a refresh operation. As data to be frequently accessed by the sub CPU 21 in the power saving mode, the SRAM stores, for example, a descriptor and packet data.

The configuration of a descriptor used in USB communication will be described next. In this embodiment, a descriptor of the EHIC standard will be described as an example. Transfer protocols of EHIC are control transfer, bulk transfer, interrupt transfer, and isochronous transfer. The USB host controller 30 generates a descriptor in accordance with the type of a transfer protocol.

Figure 2B:
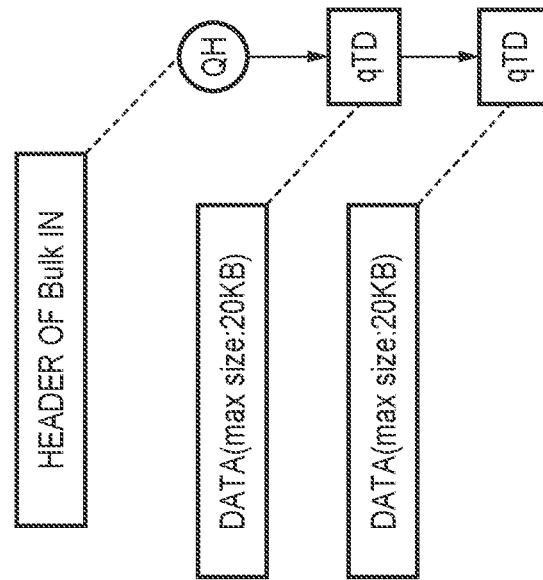
FIG. 2B is a view for explaining the configuration of a descriptor of bulk transfer.
Figure 2A:
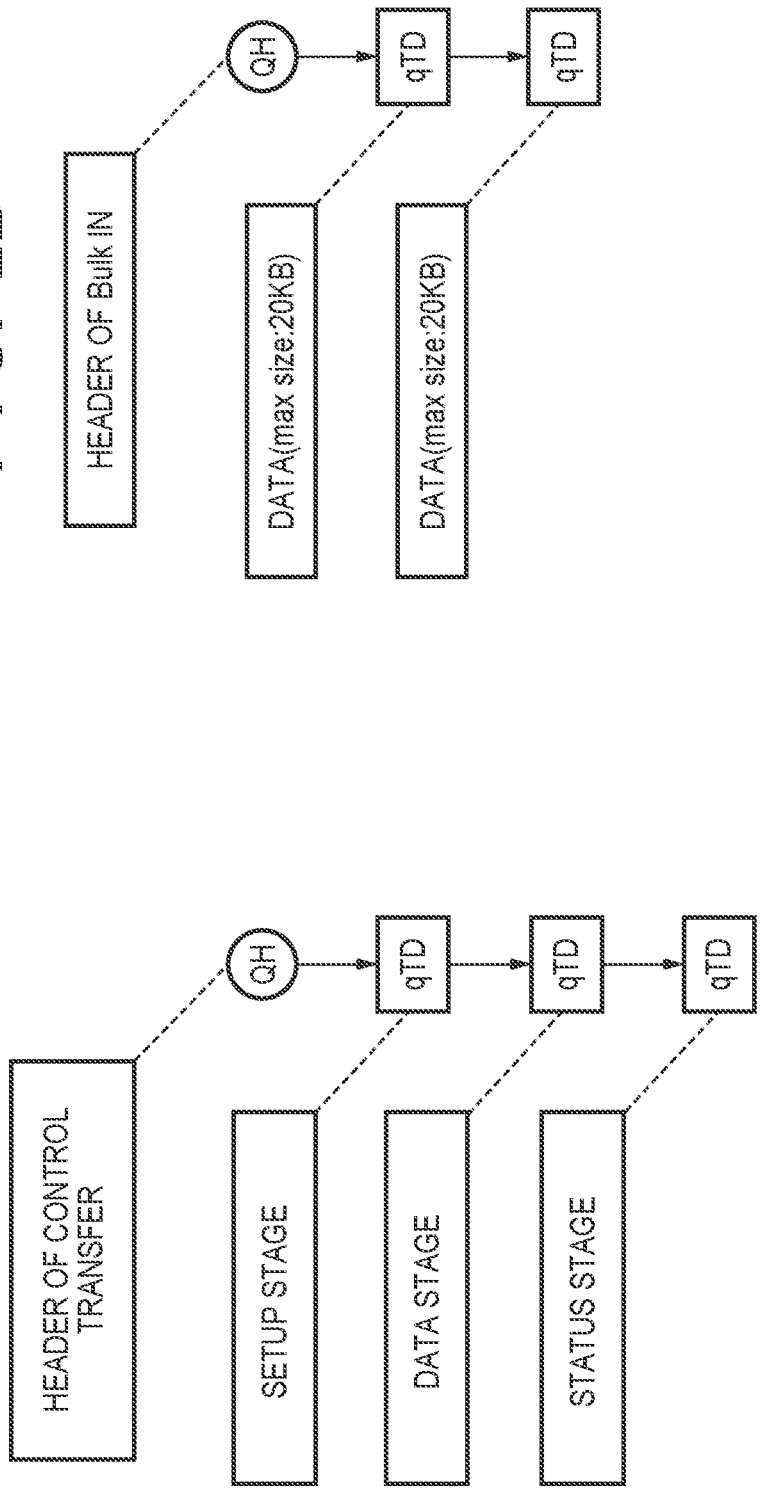
FIG. 2A is a view for explaining the configuration of a descriptor of control transfer.

FIG. 2A is a view for explaining the configuration of a descriptor of control transfer. FIG. 2B is a view for explaining the configuration of a descriptor of bulk transfer. The descriptor of each of control transfer and bulk transfer is constituted by data formed by connecting Queue Head (QH) and Queue Element Transfer Data (qTD). The QH stores end point information of the USB device 100. The qTD stores information for data transfer. The maximum data size transferrable by one qTD is 20 Kbytes. In control transfer, one qTD is needed for each of a SETUP stage, a DATA stage, and a STATUS stage.

Referring back to FIG. 1, the control system 1 has a normal mode in which the entire system can operate, and a power saving mode in which a part of the system can operate to suppress power consumption as compared to the normal mode.

FIG. 3A is a view showing the configuration of the external volatile memory in the normal mode. FIG. 3B is a view showing the configuration of the internal volatile memory in the normal mode.

In the normal mode, communication information (here, a descriptor) necessary for USB communication with the USB device 100 is stored in the external volatile memory 200 (the SDRAM in FIG. 3A). Note that in this embodiment, the descriptor is stored in the external volatile memory 200 in advance before USB communication is executed. At the time of USB communication, packet data is also stored in the external volatile memory 200 (SDRAM). The breakdown of a capacity of 100 Kbytes in the capacity of the SDRAM will be described here. In the normal mode, enumeration and a packet data transmission/reception operation when connecting the USB device 100 are assumed to be performed. Descriptor buffers for control transfer, bulk In transfer, and bulk Out transfer necessary for communication control to the USB device 100 and packet buffers thereof are set in the external volatile memory 200. A descriptor buffer for control transfer is a buffer 301, and a packet buffer for control transfer is a buffer 302. A descriptor buffer for bulk In transfer is a buffer 303, and a packet buffer for bulk In transfer is a buffer 304. A descriptor buffer for bulk Out transfer is a buffer 305, and a packet buffer for bulk Out transfer is a buffer 306. Also, the internal volatile memory 50 (the SDRAM in FIG. 3B) can be used as a Reserved area, that is, a general-purpose area (for example, an area for bulk In transfer) other than USB communication. This area is a buffer 307. The maximum storage capacity of the SRAM is, for example, 10 to 20 Kbytes.

FIG. 4A is a view showing the configuration of the external volatile memory in the power saving mode. FIG. 4B is a view showing the configuration of the internal volatile memory in the power saving mode.

In the power saving mode, the sub CPU 21 sets the external volatile memory 200 (the SDRAM in FIG. 4A) in the self-refresh state and sets the main CPU 20 and the memory controller 40 in a stop state. This can suppress the power consumption of the external volatile memory 200. In the power saving mode, however, the USB device 100 cannot access the external volatile memory 200. Hence, it is necessary to set a descriptor buffer and a packet buffer in the internal volatile memory 50 while keeping the sub CPU 21 and the USB host controller 30 in an activated state. This allows the main controller 10 to continue USB communication with the USB device 100 even in the power saving mode.

In the internal volatile memory 50 (the SRAM in FIG. 4B), only a buffer for communication information for bulk In transfer is set, and only the communication information is stored. A descriptor buffer for bulk In transfer set in the internal volatile memory 50 is a buffer 401, and a packet buffer for bulk In transfer set in the internal volatile memory 50 is a buffer 402. For example, when shifting from the normal mode to the power saving mode, the main controller 10 maintains communication with the USB device 100. Hence, enumeration that occurs when connecting the USB device 100 is unnecessary. Here, enumeration is a series of processes performed at the time of connection of the USB device 100 to the main controller 10 until the main controller 10 recognizes the USB device 100. For this reason, the areas of the descriptor buffer and the packet buffer for control transfer in the internal volatile memory 50 can be omitted. Similarly, if data transfer from the main controller 10 to the USB device 100 is not needed, the descriptor buffer and the packet buffer for bulk Out transfer in the internal volatile memory 50 can be omitted. The sub CPU 21 changes the setting of Total Byte Transfer of the QH descriptor for bulk In transfer, thereby decreasing the transfer data size per processing. This can reduce the area necessary for the packet buffer in the internal volatile memory 50 (SRAM). As described above, in the power saving mode, the descriptors of unnecessary transfer protocols and the buffer areas thereof are decreased from the internal volatile memory 50, and therefore, the capacity of the internal volatile memory 50 need not be increased.

Note that the descriptor set in the internal volatile memory 50 (SRAM) is not limited to bulk In transfer, as shown in FIG. 4B. That is, the descriptor set in the internal volatile memory 50 may be a transfer protocol according to the application purpose of USB communication with the USB device 100. For example, if USB communication in which the main controller 10 transfers data to the USB device 100 is assumed, the descriptor set in the internal volatile memory 50 is bulk Out transfer. Alternatively, the user may set in advance a priority to set each transfer protocol of USB communication in the internal volatile memory 50. The sub CPU 21 may set one or more predetermined transfer protocols in the internal volatile memory 50 based on the priority of each transfer protocol in the user setting.

FIG. 5 is a flowchart for explaining shift processing from the normal mode to the power saving mode.

In step S100, for example, if a command for shifting from the normal mode to the power saving mode is received, or if a predetermined processing signal is not received for a predetermined time, the main CPU 20 notifies the sub CPU 21 of the shift to the power saving mode.

In step S101, the sub CPU 21 performs stop processing of USB communication with the USB device 100 such that communication with the USB device 100 is not performed during the shift processing of the main CPU 20 to the power saving mode.

In step S102, the sub CPU 21 changes the saving destination of the descriptor and packet data from the external volatile memory 200 to the internal volatile memory 50. In other words, the descriptor buffer and the packet buffer are set in the internal volatile memory 50, and the descriptor is moved from the external volatile memory 200 to the internal volatile memory 50. Note that at this time, the descriptor may be copied to the internal volatile memory 50 while keeping it left in the external volatile memory 200, thereby saving the descriptor in the internal volatile memory 50. Note that packet data is generated at the time of USB communication and is therefore not saved in the external volatile memory 200 at the timing of the shift processing of the main CPU 20 to the power saving mode. For this reason, here, only the packet buffer is set in the internal volatile memory 50, and no packet data is moved and saved in the packet buffer. In addition, the sub CPU 21 changes the setting of Total Byte Transfer of the QH descriptor for bulk In transfer, which is decided based on, for example, the priority to set each transfer protocol in the internal volatile memory 50. The change of the setting of the Total Byte Transfer is a setting change for decreasing the transfer data size per processing in accordance with the capacity of the internal volatile memory 50. This can decrease the capacity of the buffer set in the internal volatile memory 50 and avoid capacity shortage in the internal volatile memory 50.

In step S103, the sub CPU 21 shifts the external volatile memory 200 to the self-refresh state.

In step S104, the sub CPU 21 stops the clock of the main CPU 20.

In step S105, the sub CPU 21 performs processing of resuming communication with the USB device 100.

In step S106, the control system 1 shifts to the power saving mode.

Figure 6:
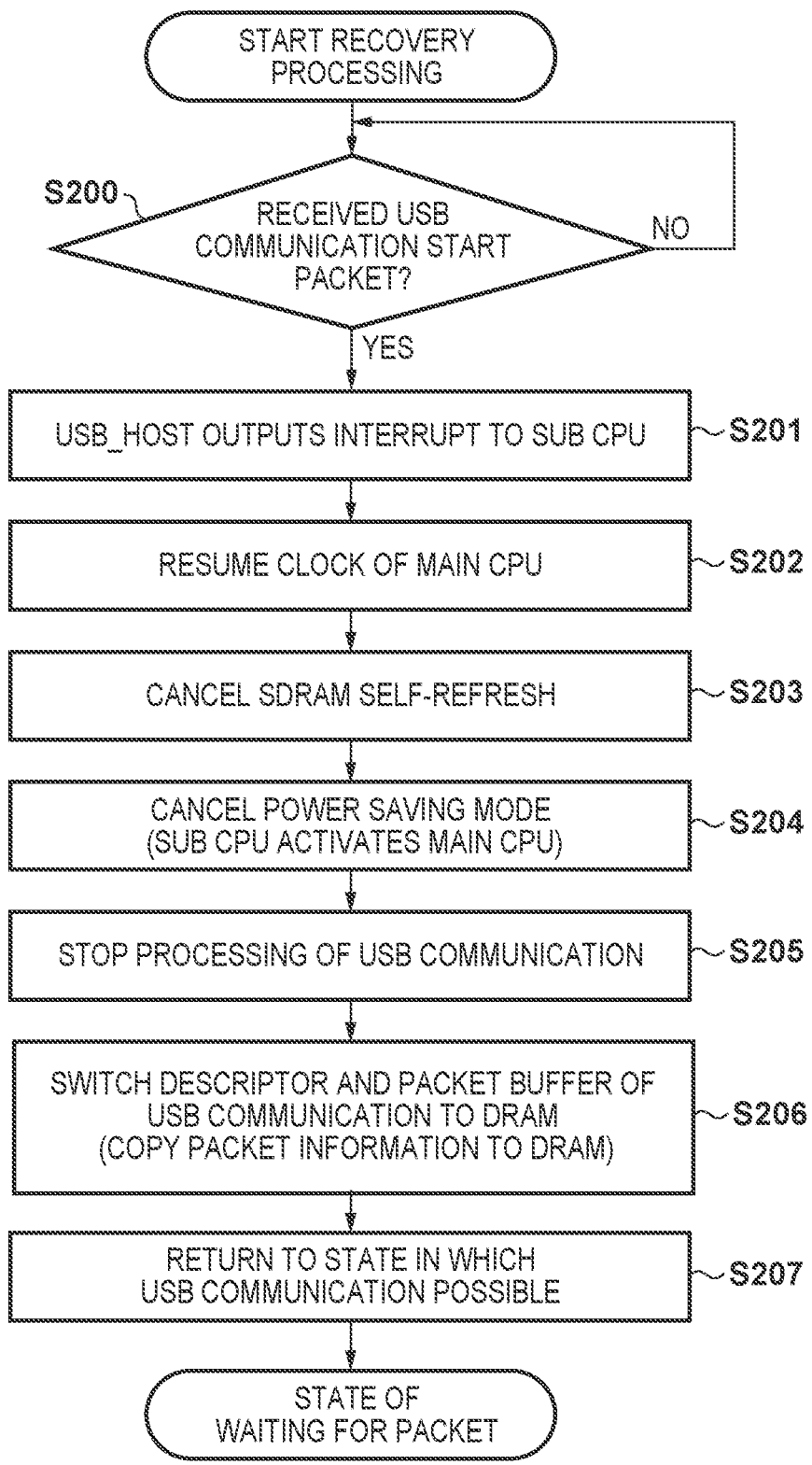
FIG. 6 is a flowchart for explaining return processing from the power saving mode to the normal mode.

FIG. 6 is a flowchart for explaining return processing from the power saving mode to the normal mode.

In step S200, the sub CPU 21 waits until a packet is received from the USB device 100 (NO in step S200). If the sub CPU 21 receives a packet from the USB device 100 (YES in step S200), in step S201, the USB host controller 30 outputs an interrupt signal to the sub CPU 21.

In step S202, the sub CPU 21 resumes the clock of the main CPU 20 based on the interrupt signal received from the USB host controller 30.

In step S203, the sub CPU 21 cancels the self-refresh state of the external volatile memory 200.

In step S204, the control system 1 cancels the power saving mode, and the main component of control of the control system 1 changes to the main CPU 20.

In step S205, the main CPU performs stop processing of USB communication.

In step S206, the main CPU 20 copies the packet data in the internal volatile memory 50, which is received in step S200, to the external volatile memory 200. At this time, the storage destination of the descriptor and the packet data is switched from the internal volatile memory 50 to the external volatile memory 200.

In step S207, the main CPU 20 resumes USB communication with the USB device 100 and receives remaining packet data from the USB device 100.

Second Embodiment

In the first embodiment, if the main controller 10 performs USB communication with one USB device 100 in the power saving mode, a setting is done to decide the descriptor to be stored in the internal volatile memory 50 and reduce the transfer data size. On the other hand, in the second embodiment, an example in which if a main controller 10 performs USB communication with a plurality of devices in the power saving mode, or executes both USB communication and communication by a wired LAN, packet buffer assignment in an internal volatile memory 50 is performed for each USB device will be described. In the second embodiment, packet buffer assignment in the internal volatile memory 50 for each USB device is changed in accordance with the number and types of USB devices connected to the main controller 10 in the power saving mode. Note that in the second embodiment, differences from the first embodiment will be described.

Figure 7:
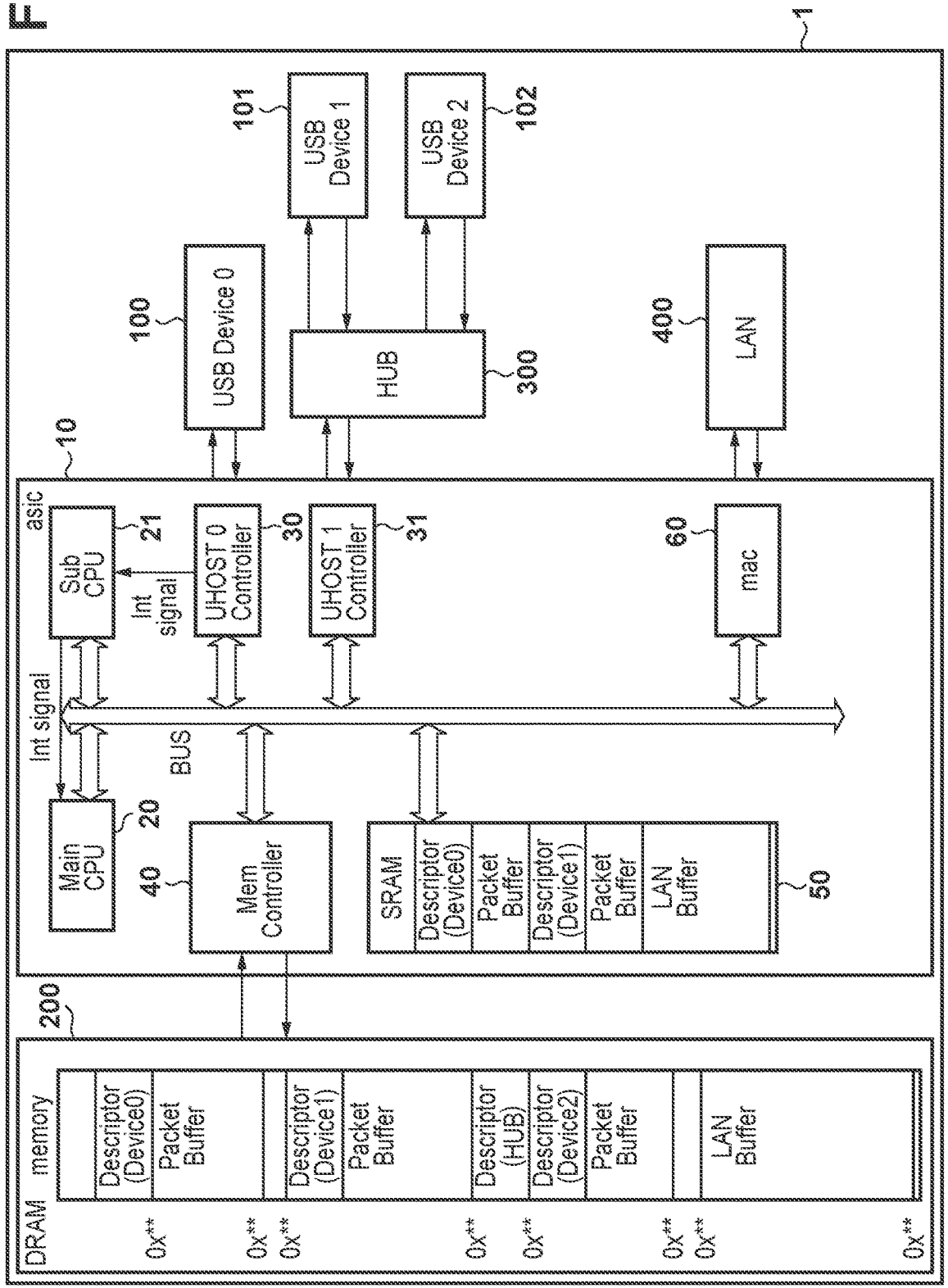
FIG. 7 is a schematic view of a control system according to the second embodiment.

FIG. 7 is a schematic view of a control system according to the second embodiment.

In addition to the configuration according to the first embodiment, a control system 1 includes a plurality of USB devices (a USB device 101 and a USB device 102). The USB device 101 is, for example, an IC card reader. The USB device 102 is, for example, a USB memory. The USB device 101 and the USB device 102 are connected to the main controller 10 via a HUB controller 300. Also, the control system 1 includes a wired local area network (LAN) 400 configured to perform wired network connection. In addition to the configuration according to the first embodiment, the main controller 10 includes a USB host controller 31 configured to connect the HUB controller 300, and a Media Access Controller (MAC) controller 60 configured to connect the wired LAN 400. The USB host controller 31 and the MAC controller 60 each have the DMA function, as in the first embodiment. The USB host controller 31 performs packet data transmission/reception between the USB device 101 or the USB device 102 and an external volatile memory 200 or the internal volatile memory 50. The MAC controller 60 performs packet data transmission/reception between the wired LAN 400 and the external volatile memory 200 or the internal volatile memory 50.

As in the first embodiment, the control system 1 has two operation modes, that is, a normal mode and a power saving mode. In the normal mode, a descriptor and packet data necessary for USB communication with each device are stored in the external volatile memory 200. As in the first embodiment, the descriptor is stored in the external volatile memory 200 in advance before USB communication is executed. At the time of USB communication, packet data is also stored in the external volatile memory 200 (SDRAM). In the normal mode according to this embodiment, enumeration and a data transmission/reception operation at the time of USB communication between the main controller 10 and a USB device 100, the USB device 101, the USB device 102, and the HUB controller 300 are assumed to be performed. That is, in the normal mode, descriptor buffers for control transfer, bulk In transfer, and bulk Out transfer in USB communication with the USB device 100 and packet buffers thereof are set in the external volatile memory 200. Also, descriptor buffers for control transfer, bulk In transfer, and bulk Out transfer in USB communication with the USB device 101 and packet buffers thereof are set in the external volatile memory 200. Also, descriptor buffers for control transfer, bulk In transfer, and bulk Out transfer in USB communication with the USB device 102 and packet buffers thereof are set in the external volatile memory 200. Furthermore, descriptor buffers for control transfer, bulk In transfer, and bulk Out transfer in USB communication with the HUB controller 300 and packet buffers thereof are set in the external volatile memory 200. A buffer necessary for communication with the wired LAN 400 may be set in the external volatile memory 200.

In the power saving mode, a descriptor buffer necessary for USB communication of the control system 1 and a packet buffer thereof are set in the internal volatile memory 50, as in the first embodiment.

Figure 8B:
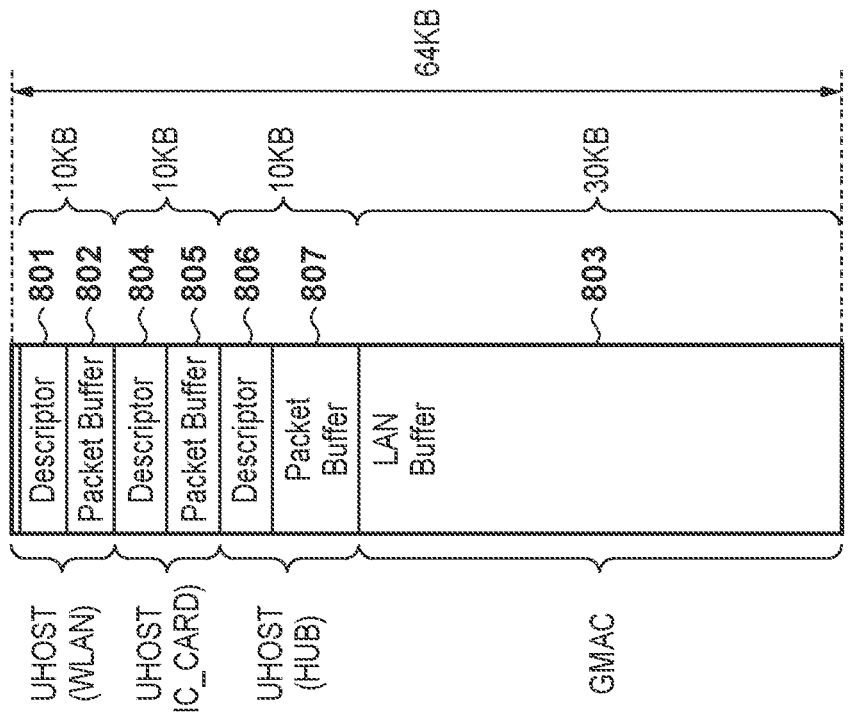
FIG. 8B is a view showing the configuration of the internal volatile memory in the power saving mode.
Figure 8A:
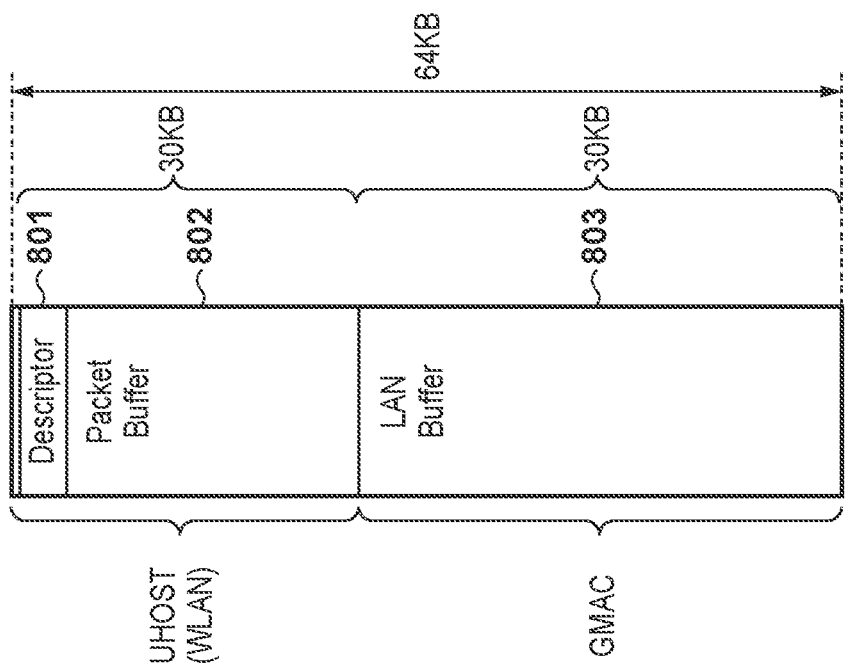
FIG. 8A is a view showing the configuration of an internal volatile memory in a power saving mode.

FIGS. 8A and 8B are views showing the configuration of the internal volatile memory in the power saving mode.

An SRAM configuration (1) in the power saving mode shown in FIG. 8A is the configuration of the internal volatile memory 50 (SRAM) in a case where the main controller 10 simultaneously communicates with the USB device 100 and the wired LAN 400. That is, buffer setting and data movement/copy are performed such that the buffer configuration shown here is obtained in the power saving mode. Here, the maximum storage capacity of the internal volatile memory

50 is, for example, 64 Kbytes. A memory capacity used in communication with the wired LAN 400 is 30 Kbytes. The memory capacity is the capacity of a LAN buffer, and the buffer is a buffer 803. Note that the LAN buffer is an area used for data saving if communication by the wired LAN 400 occurs, and no information is stored before communication occurs, like a packet buffer. A memory capacity used in USB communication with the USB device 100 that is a WLAN device is 30 Kbytes. The information is information used in USB communication with the USB device 100 that is a WLAN device, and a descriptor buffer for control transfer, bulk In transfer, and bulk Out transfer is a buffer 801. The information is information used in USB communication with the USB device 100 that is a WLAN device, and a packet buffer for control transfer, bulk In transfer, and bulk Out transfer is a buffer 802.

An SRAM configuration (2) in the power saving mode shown in FIG. 8B is the configuration of the internal volatile memory 50 (SRAM) in a case where the control system 1 simultaneously communicates with the USB devices 100 and 101, the HUB controller 300, and the wired LAN 400. That is, buffer setting and data movement/copy are performed such that the buffer configuration shown here is obtained in the power saving mode. Here, the capacity of the internal volatile memory 50 is 64 Kbytes. The memory capacity (buffer 803) used in communication with the wired LAN 400 is 30 Kbytes. The memory capacity used to perform USB communication with each of the USB devices 100 and 101 and the HUB controller 300 is 30 Kbytes. More specifically, the information is information used in USB communication with the USB device 101 that is an IC card reader, and a descriptor buffer for control transfer, bulk In transfer, and bulk Out transfer is a buffer 804. The information is information used in USB communication with the USB device 101 that is an IC card reader, and a packet buffer for control transfer, bulk In transfer, and bulk Out transfer is a buffer 805. The information is information used in USB communication with the HUB controller 300, and a descriptor buffer used for control transfer, bulk In transfer, and bulk Out transfer is a buffer 806. The information is information used in USB communication with the HUB controller 300, and a packet buffer for control transfer, bulk In transfer, and bulk Out transfer is a buffer 807.

Concerning assignment of the memory capacity used to perform USB communication with each USB device in the configuration (1) and the configuration (2), as in the first embodiment, the descriptors of unnecessary transfer protocols to each USB device and the buffer areas thereof may be decreased by changing the setting of the descriptors. As described above, in the second embodiment, packet buffer assignment in the internal volatile memory 50 can be changed in accordance with the number and types of USB devices that perform USB communication in the power saving mode. Control for changing assignment of the packet buffers in the internal volatile memory 50 will be described below.

Figure 9:
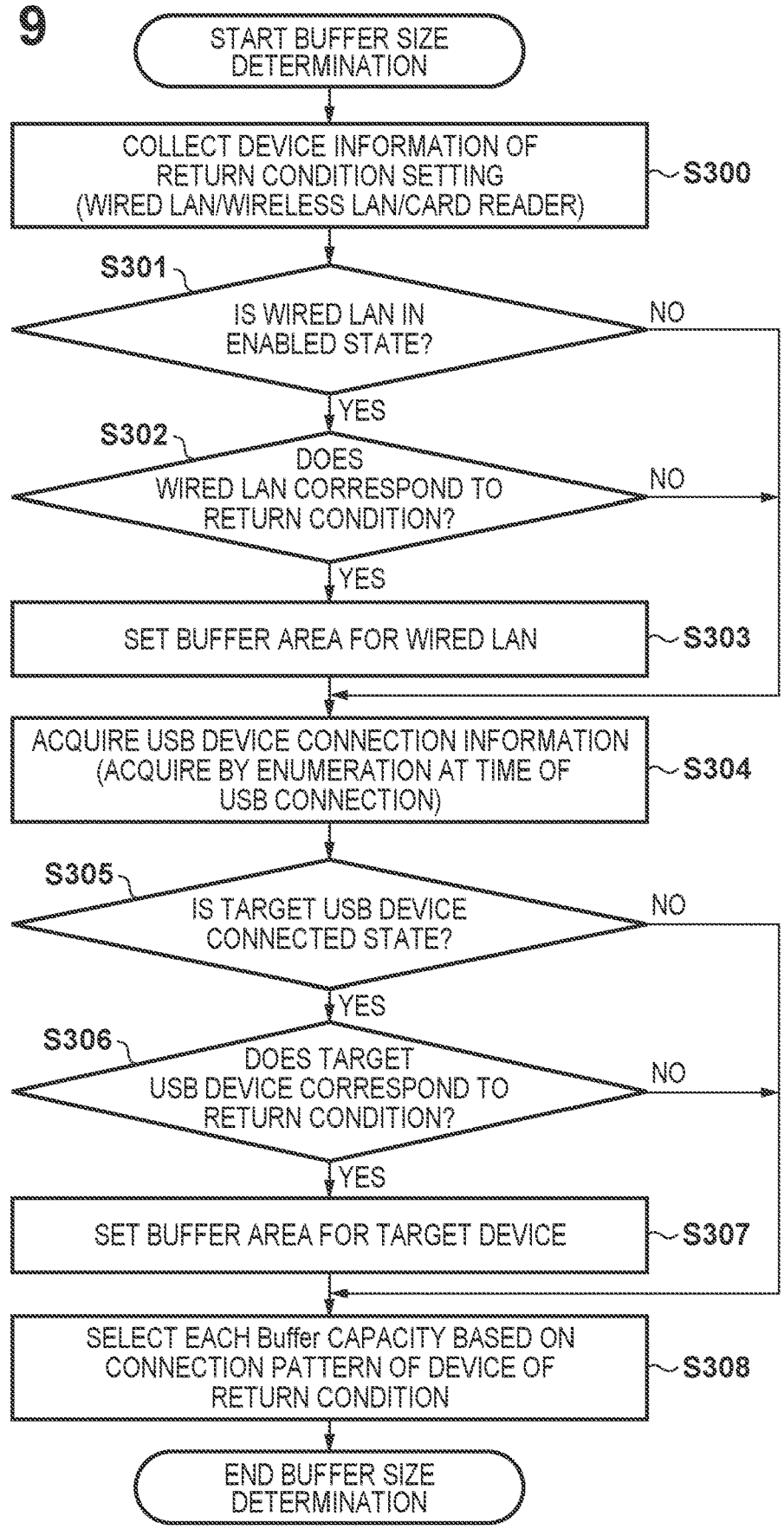
FIG. 9 is a flowchart for explaining processing of deciding a buffer size for each device.

FIG. 9 is a flowchart for explaining processing of deciding a buffer size for each device. This processing may be executed by a sub CPU 21 when the control system 1 shifts to the power saving mode.

In step S300, the sub CPU 21 acquires information of devices associated with a return condition from the power saving mode to the normal mode. The devices associated with the return condition include the wired LAN 400, the USB device 100 (WLAN), and the USB device 101 (card reader). Note that the devices associated with the return condition may be set in advance based on user selection.

In step S301, the sub CPU 21 discriminates the enabled state of communication with the wired LAN 400. If the sub CPU 21 determines that the enabled state of communication with the wired LAN 400 is "enabled" (YES in step S301), the process advances to step S302. On the other hand, if the sub CPU 21 determines that the enabled state of communication with the wired LAN 400 is not "enabled" (NO in step S301), the process advances to step S304.

In step S302, the sub CPU 21 determines, based on the information acquired in step S300, whether the wired LAN 400 is the device associated with the return condition. If the sub CPU 21 determines that the wired LAN 400 is the device associated with the return condition (YES in step S302), the process advances to step S303. On the other hand, if the sub CPU 21 determines that the wired LAN 400 is not the device associated with the return condition (NO in step S302), the process advances to step S304.

In step S303, the sub CPU 21 sets, in the internal volatile memory 50, a buffer area for storing a packet from the wired LAN 400.

In step S304, the sub CPU 21 acquires USB connection information of the USB devices 100 and 101 to the main controller 10. The sub CPU 21 may 21 may acquire the USB connection information based on, for example, a descriptor acquired by enumeration when the USB devices 100 and 101 are USB-connected to the main controller 10.

In step S305, the sub CPU 21 determines, based on the USB connection information of the USB devices 100 and 101 acquired in step S304, whether a target device is in a USB-connected state to the main controller 10. If the sub CPU 21 determines that the target device is in the USB-connected state (YES in step S305), the process advances to step S306. On the other hand, if the sub CPU 21 determines that the target device is not in the USB-connected state (NO in step S305), the process advances to step S308.

If the sub CPU 21 determines in step S306 that the connected USB device corresponds to the device associated with the return condition acquired in step S300 (YES in step S306), the process advances to step S307. If the sub CPU 21 determines in step S306 that the connected USB device does not correspond to the device associated with the return condition acquired in step S300 (NO in step S306), the process advances to step S308.

In step S307, the sub CPU 21 performs setting to provide a packet buffer for the target device in the internal volatile memory 50.

In step S308, the sub CPU 21 decides a buffer size to be assigned for each device using a selection table based on the combination of return conditions. The selection table holds, for example, the connection pattern of each device and a buffer size to be assigned for each device in association with each other, as shown in FIG. 10.

FIG. 10 is a view for explaining a selection table that defines a buffer size for each device.

Case0 indicates buffer size assignment in the internal volatile memory 50 in a case where the wired LAN 400, the USB device 100, and the USB device 101 are connected to the main controller 10. A buffer size assigned to communication with the wired LAN 400 is 30 Kbytes. A buffer size assigned to USB communication with the USB device 100 is 8 Kbytes. A buffer size assigned to USB communication with the USB device 101 is 8 Kbytes.

Case1 indicates buffer size assignment in the internal volatile memory 50 in a case where the wired LAN 400 and the USB device 100 are connected to the main controller 10. A buffer size assigned to communication with the wired LAN 400 is 30 Kbytes. A buffer size assigned to USB communication with the USB device 100 is 24 Kbytes.

Case2 indicates buffer size assignment in the internal volatile memory 50 in a case where the USB device 100 and the USB device 101 are connected to the main controller 10. A buffer size assigned to USB communication with the USB device 100 is 24 Kbytes. A buffer size assigned to USB communication with the USB device 101 is 24 Kbytes.

Case3 indicates buffer size assignment in the internal volatile memory 50 in a case where only the USB device 100 is connected to the main controller 10. A buffer size assigned to USB communication with the USB device 100 is 56 Kbytes.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-017826, filed Feb. 8, 2023, which is hereby incorporated by reference herein in its entirety.

What is claimed is:

1. An information processing apparatus configured to communicate with a device, comprising:
   at least one processor; and
   at least one memory coupled to the at least one processor, the memory storing instructions that, when executed by the processor, cause the processor to act as:
   a control unit configured to perform control to store, in a first operation mode, predetermined communication information that is information used for communication with the device in a first memory, and store, in a second operation mode different from the first operation mode, the predetermined communication information in a second memory whose capacity is smaller than a capacity of the first memory,
   wherein when shifting from the first operation mode to the second operation mode, the control unit performs control of changing a setting of the predetermined communication information such that a size of a saving destination of packet data transferred to the second memory is a predetermined size.

2. The apparatus according to claim 1, wherein if a plurality of pieces of predetermined communication information are stored in the first memory, and a shift from the first operation mode to the second operation mode is performed, the control unit performs control of storing, in the second memory, specific predetermined communication information decided based on a priority to store each of the plurality of pieces of predetermined communication information in the second memory.

3. The apparatus according to claim 1, wherein if a shift from the first operation mode to the second operation mode is performed, the control unit performs control of setting the first memory in a self-refresh state.

4. The apparatus according to claim 1, wherein if a shift from the second operation mode to the first operation mode is performed, the control unit performs control of copying packet data stored in the second memory by the communication in the second operation mode to the first memory.

5. The apparatus according to claim 1, wherein if a shift from the first operation mode to the second operation mode is performed, or if a shift from the second operation mode to the first operation mode is performed, the control unit performs control of interrupting communication with the device.

6. The apparatus according to claim 1, wherein the predetermined communication information is associated with a transfer protocol of the communication, and the transfer protocol includes at least one of control transfer, bulk transfer, interrupt transfer, and isochronous transfer.

7. The apparatus according to claim 1, wherein the second operation mode is a mode in which power consumption of the first memory is smaller than in the first operation mode.

8. The apparatus according to claim 1, wherein if a shift from the first operation mode to the second operation mode is performed, the control unit performs control of storing, in the second memory, at least one of predetermined communication information used for communication with each of a plurality of devices connected to the information processing apparatus and information about assignment of a buffer size, which is decided based on the number and types of the plurality of devices.

9. The apparatus according to claim 8, further comprising a change unit configured to perform a change from the second operation mode to the first operation mode if a communication request to the information processing apparatus is received from a specific device of a plurality of devices in the second operation mode.

10. The apparatus according to claim 9, further comprising an input unit configured to input a type of the specific device.

11. The apparatus according to claim 9, wherein the specific device includes a USB device and a wired LAN.

12. The apparatus according to claim 1, wherein the first memory is an SDRAM, and the second memory is an SRAM.

13. The apparatus according to claim 1, wherein the predetermined communication information is a descriptor.

14. The apparatus according to claim 1, wherein the predetermined communication information is information used for communication by a USB.

15. The apparatus according to claim 1, wherein the predetermined communication information is information used for communication by a wired LAN.

16. The apparatus according to claim 1, further comprising a print unit configured to execute printing.

17. A control system comprising:
an information processing apparatus defined in claim 1; and
at least one device configured to communicate with the information processing apparatus.

18. A method comprising:
performing control to store, in a first operation mode, predetermined communication information that is information used for communication with the device in a first memory, and store, in a second operation mode different from the first operation mode, the predetermined communication information in a second memory whose capacity is smaller than a capacity of the first memory,
wherein when shifting from the first operation mode to the second operation mode, control of changing a setting of the predetermined communication information is performed such that a size of a saving destination of packet data transferred to the second memory is a predetermined size.

19. A non-transitory computer-readable storage medium storing instructions that, when executed by a computer, cause the computer to perform a method comprising:
performing control to store, in a first operation mode, predetermined communication information that is information used for communication with the device in a first memory, and store, in a second operation mode different from the first operation mode, the predetermined communication information in a second memory whose capacity is smaller than a capacity of the first memory,
wherein when shifting from the first operation mode to the second operation mode, control of changing a setting of the predetermined communication information is performed such that a size of a saving destination of packet data transferred to the second memory is a predetermined size.

* * * * *